Figures 1, 2, 3:
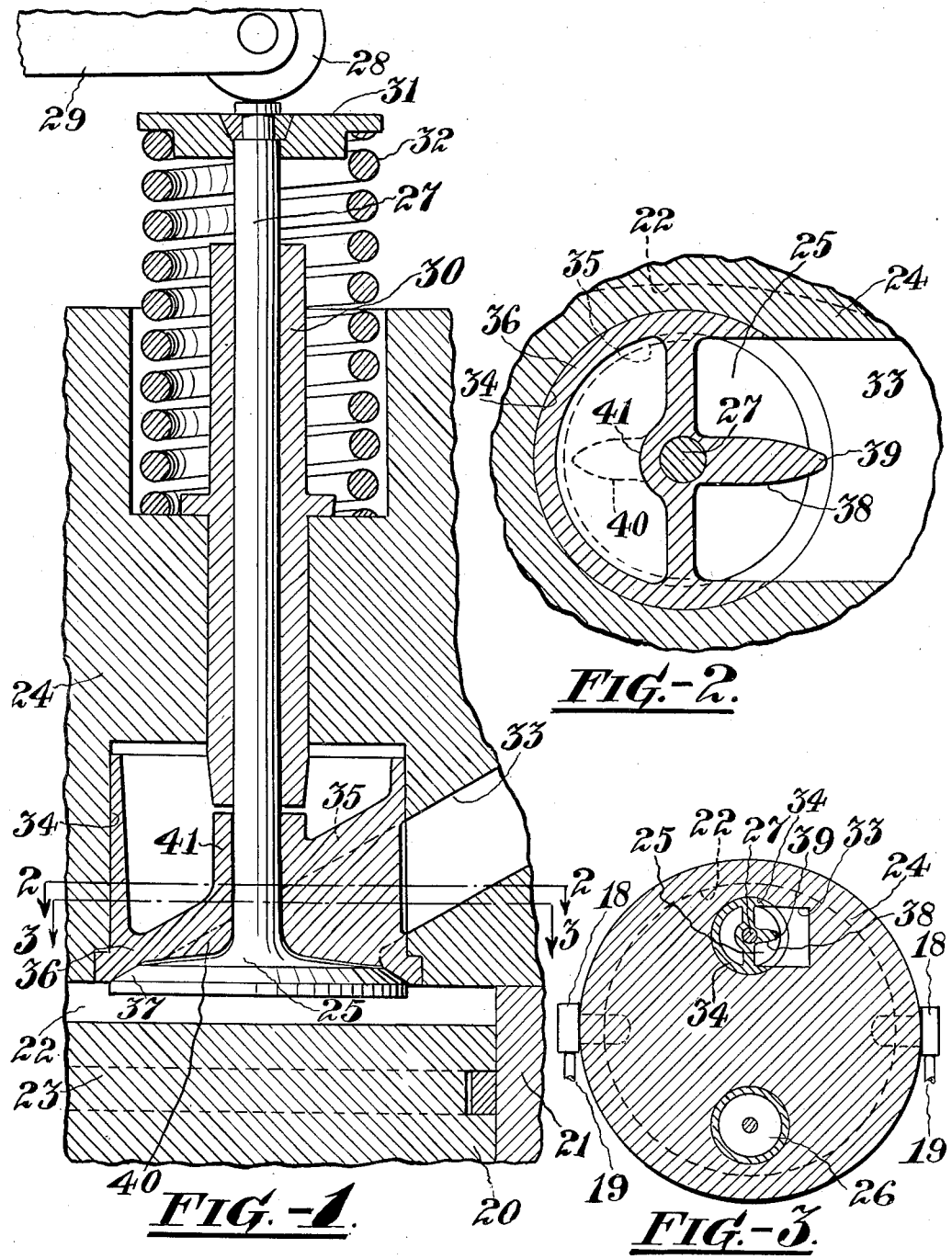

Sept. 15, 1936.   F. FRELIN   2,054,621

INTERNAL COMBUSTION ENGINE

Filed Aug. 23, 1935

INVENTOR
Fritjof Frelin
BY Chester A. Adee
HIS ATTORNEY.

Patented Sept. 15, 1936

2,054,621

UNITED STATES PATENT OFFICE 2,054,621

INTERNAL COMBUSTION ENGINE

Fritjof Frelin, Phillipsburg, N. J., assignor to Ingersoll-Rand Company, Jersey City, N. J., a corporation of New Jersey Application August 23, 1935, Serial No. 37,448

5 Claims. (Cl. 123—188)

This invention relates to internal combustion engines, and more particularly to valve mechanism for engines of this type.

One object of the invention is to effect a stream line flow of the entire air mass introduced into the engine and thereby prevent the formation of eddy currents in the air stream.

Another object is to assure a high degree of rotative turbulence of the air mass admitted into the combustion chamber.

Other objects will be in part obvious and in part pointed out hereinafter.

In the drawing accompanying this specification and in which similar reference numerals refer to similar parts, Figure 1 is an elevation, in section, of a portion of an engine and valve mechanism constructed in accordance with the practice of the invention, and Figures 2 and 3 are transverse views taken through Figure 1 on the lines 2—2 and 3—3, respectively.

Referring more particularly to the drawing, the engine shown for the purpose of illustrating a practical embodiment of the invention, is designated by 20 and comprises a cylinder 21 having a chamber 22 to accommodate a piston 23. The chamber 22 constitutes both a piston chamber and a combustion chamber and a closure is provided therefor, in the form of a head 24 which may be secured to the cylinder 21 in any well known manner.

The fuel for operating the engine is injected into the chamber 22 through spray nozzles 18 which may be seated in the wall of the cylinder 21 adjacent the head 24 and on diametrically opposite sides of the chamber 22, preferably at right angles to the plane extending through the valves controlling the admission of air into the cylinder and the exhaust of burned gases from the cylinder. The nozzles 18 may communicate with a source of fuel supply, or a distributing device, (not shown) through conduits 19.

As an additional function, the head 24 serves as a housing for valves 25 and 26 of which the former controls the admission of air into the combustion chamber 22 and the latter the exhaust of gases from the combustion chamber. Both valves may be of the poppet type and, insofar as the present invention is concerned mainly with the air admission apparatus, only the valve 25 and the elements associated therewith will be described in detail.

The valve 25 has the usual stem 27 which projects above the head 24 for engagement with a roller 28 carried by a rocker arm 29 whereby the valve is actuated to its open position. The stem 27 extends slidably through a valve guide 30 seated in the head 24 and carries a flange 31 which serves as a seat for an end of a spring 32 encircling the valve stem and acting against the head 24 to shift the valve 25 for closing the outlet end of an air inlet passage 33 in the head 24.

The passage 33 is inclined with respect to the axis of the cylinder and may be so arranged with respect to the combustion chamber that the air, upon entering the chamber, is deflected by its wall and thereby caused to rotate about the axis of the chamber and past the outlet opening of the nozzles 18 as a rapidly revolving mass.

In the form of the invention illustrated, the passage 33 opens into a recess 34 in the head 24, and a chamber or channel 35 in a valve seat 36 inserted in the recess 34 constitutes a continuation of the passage 33 and opens into the combustion chamber 22. The surfaces of the channel 35 are in alignment with the surface of the passage 33 to assure the flow of the air through the channel 35 and its entrance into the combustion chamber along substantially the course of flow through the passage 33. Preferably, the passage 33 inclines in the same degree as a seating surface 37 for the valve 25 and defining the outlet opening for the passage 33. In order to avoid any restrictions along the path of air flow the valve seat 37 is arranged to lie outside of the plane of the uppermost portion of the surface of the passage 33.

From the foregoing it will be seen that, in the operation of the engine, the air entering the combustion chamber will be directed against its wall and caused to swirl rapidly along a spiral course through the piston chamber. The whirling motion of the air continues on the compression stroke of the piston and when the fuel is injected into the air mass it will become thoroughly disintegrated and combine with the air to form a homogeneous and readily combustible mixture.

As is well known, in engines of the internal combustion type and in which a cylindrical valve stem extends across the path of flow of the air entering the combustion chamber the air strikes against the stem and eddying currents of air are formed both on the up-stream and down-stream sides of the stem. Such eddying currents do not only decrease, in a considerable degree, the velocity of the air stream but by continuing their independent revolving movement in the combustion chamber accumulate a disproportionate amount of fuel. The result is a stratified fuel charge of which portions burn imperfectly and cause a smoky exhaust. In order to avoid this undesirable condition it is contemplated to effect a stream line flow of the air through the air inlet passage into the combustion chamber.

The means whereby this effect is obtained consists of a rib 38 in the valve seat 36. The rib has opposed rounded sides converging toward a rounded end or edge 39 which points toward the passage 33. The rib 38 extends from the top to the bottom of the channel 35 and serves to divide that portion of the channel into two parts so that the air flowing from the passage 33 is divided into two streams by the rib 38 and guided thereby around the stem 27 of the valve. The air streams flowing on opposite sides of the rib 38 will again join after passing the valve stem and the air will, therefore, enter the combustion chamber as a single stream. In order, however, to minimize or prevent the formation of eddying currents on the down-stream side of the valve stem a rib 40 is also formed on that side of the valve. The confronting ends of the ribs 38 and 40 may be joined to provide a bearing for the adjacent portion of the stem 27, and such bearing, designated 41, may be extended to a point near the lower end of the valve guide 30.

In practice, the present invention has been found to function in a highly efficient manner. This is due to the fact that by avoiding or greatly minimizing the occurrence of eddying currents in the air flowing through the inlet passage a maximum supply of air may be introduced into the combustion chamber through an opening of given area and all portions of the air stream will move only along a single course and will not be impeded by counter-currents or localized whirling currents of air.

I claim:

1. An internal combustion engine having a combustion chamber and an air inlet passage, a valve to control communication between the passage and the combustion chamber and having a stem extending across the passage, and means extending across the passage in the plane of the valve stem to divert the air from the stem and thereby minimize the formation of eddy currents adjacent the stem.

2. An internal combustion engine having a combustion chamber and an air inlet passage, a valve seat chambered to form a continuation of the passage, a valve to control the passage and having a stem extending across the passage, and means integral with the valve seat extending across the passage in the plane of the valve stem to minimize the formation of eddy currents of air on the up-stream and down-stream sides of the valve stem.

3. An internal combustion engine having a combustion chamber and a passage for conveying air to the combustion chamber, a valve to control communication between the passage and the combustion chamber and having a stem extending across the path of air flow to the combustion chamber, and deflecting means extending across the passage in the plane of the valve stem for diverting the air from the plane of the valve stem.

4. An internal combustion engine having a combustion chamber and a passage for conveying air to the combustion chamber, a valve to control communication between the passage and the combustion chamber and having a stem extending across the path of air flow to the combustion chamber, and deflecting means extending across the passage in the plane of the valve stem to deflect air from the up-stream side of the valve stem.

5. An internal combustion engine having a combustion chamber and a passage for conveying air to the combustion chamber, a valve seat chambered to form a continuation of the passage, a valve to control communication between the passage and the combustion chamber and having a valve extending across the passage, a deflector in the valve seat extending across the passage to deflect air from the up-stream side of the valve stem, and means on the valve seat positioned in the plane of the valve stem to minimize the formation of eddy currents of air adjacent the down-stream side of the valve stem.

FRITJOF FRELIN.

CERTIFICATE OF CORRECTION.

Patent No. 2,054,621.                                September 15, 1936.

FRITJOF FRELIN.

It is hereby certified that error appears in the printed specification of the above numbered patent requiring correction as follows: Page 2, second column, line 21, claim 3, strike out the words "plane of the"; and that the said Letters Patent should be read with this correction therein that the same may conform to the record of the case in the Patent Office.

Signed and sealed this 1st day of December, A. D. 1936.

Henry Van Arsdale
(Seal) Acting Commissioner of Patents.